S. R. DUMMER.

Combined Measure and Funnel.

No. 2,012. Reissued June 27, 1865.

Witnesses:

Lemuel W. Serrell

Thos. Geo. Harold

Inventor:

Saml. R. Dummer

N. PETERS, Photo-Lithographer, Washington, D. C.

UNITED STATES PATENT OFFICE.

SAMUEL R. DUMMER, OF NEW YORK, N. Y.

IMPROVEMENT IN COMBINED MEASURE AND FUNNEL.

Specification forming part of Letters Patent No. 42,174, dated April 5, 1864; Reissue No. 2,012, dated June 27, 1865.

*To all whom it may concern:*

Be it known that I, SAMUEL R. DUMMER, of the city, county, and State of New York, have invented a new and Improved Combined Liquid Measurer and Funnel; and I do hereby declare that the following is a full, clear, and exact description thereof, which will enable others skilled in the art to make and use the same, reference being had to the accompanying drawings, forming part of this specification.

Heretofore in the use of liquid-measures it has been necessary, if desired to pour the liquid measured into a bottle or other vessel having a small or comparatively small orifice, to use a funnel of suitable size, the disadvantages of which are many, among which may be mentioned as the most important its inconvenience, as the funnel was apt to be mislaid, causing much loss of time and annoyance.

To remedy the above is the object of the present invention, and is secured thereby, it consisting in the combination, with any of the ordinary liquid-measures used, of a proper-shaped funnel, whereby the liquid can be readily and easily poured into a bottle or other vessel without the least danger of spilling and wasting it, among the many advantages resulting from which are its neatness and compactness of form, its economy, as it costs less to manufacture than if made separate from each other, its convenience in use, as the proper funnel is always at hand, never being mislaid, and nowaste of the liquid can occur, as all remaining in the funnel flows back again into the main vessel.

Figure 1:
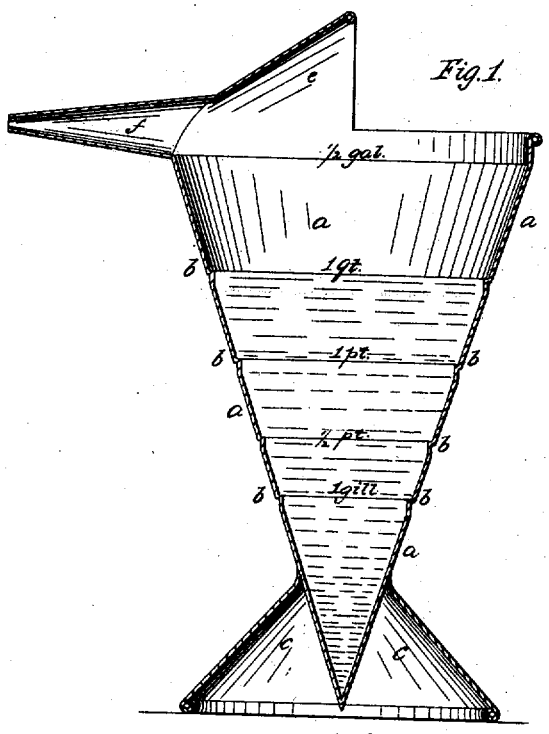
Figure 2:
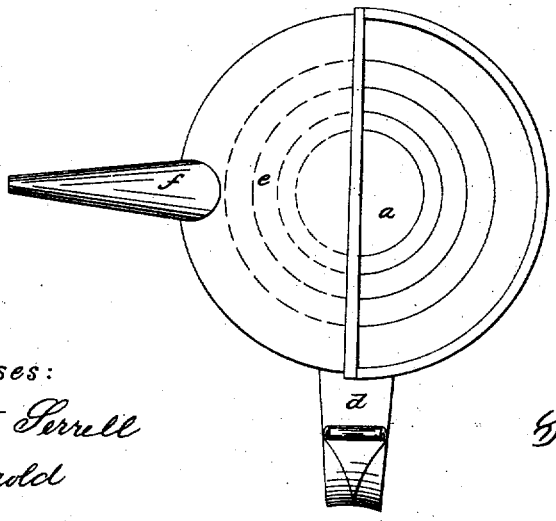

In accompanying plate of drawing one form of my improved liquid-measure and funnel combined is illustrated, Figure 1 being a central vertical section, and Fig. 2 a plan of the same.

Similar letters indicate like parts in both figures.

*a a* in the drawings represent a conical graduated measuring-vessel having grooves *b b b* at such points of its outside and extending entirely around it as denote quarts, pints, half-pints, gills, &c. This vessel *a* may be more or less flaring than that shown, and is sustained by a flange or skirt, *c*, and provided with a suitable handle, *d*, upon one side.

*e* is an arched top-covering plate extending over about one-half of the top of the vessel *a*, and attached thereto by soldering, riveting, or in any proper manner, connected with which is a tapering pipe, *f*. This top plate, *e*, and plate *f*, in connection with the vessel, it is evident, form a funnel, through the pipe *f* of which the liquid in the measure can be easily and readily poured into a bottle or other receptacle without spilling or wasting it, the covering-plate preventing the liquid from overflowing the top edge of the measuring-vessel, the advantages of which have been hereinbefore enumerated.

By means of the grooves *b b* upon the outside of the measuring-vessel the quantity of liquid in it can be more readily observed, and each rib formed thereby upon the inside of the vessel corresponds to the top of a separate measure of the given capacity.

Although I have described my combined measure and funnel with the measuring-vessel of a conical shape, and with graduations upon its interior to indicate quarts, pints, &c., it is apparent it can be as well adapted to measuring-vessels of various shapes and sizes and either plain or with suitable graduations.

I claim as new and desire to secure by Letters Patent—

As a new article of manufacture, a combined measuring vessel and funnel, substantially as and for the purposes specified.

The above specification of my invention signed by me this 15th day of May, 1865.

SAML. R. DUMMER.

Witnesses:

ALBERT W. BROWN,
M. M. LIVINGSTON.